B. F. CRANWELL.
SPRAYING APPARATUS.
APPLICATION FILED MAR. 11, 1912.
1,095,710.
Patented May 5, 1914.
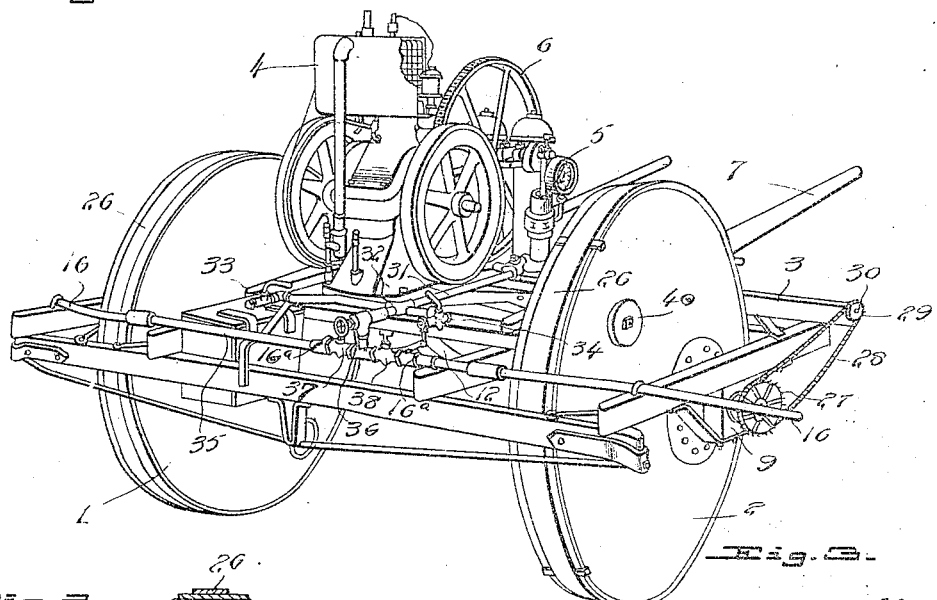
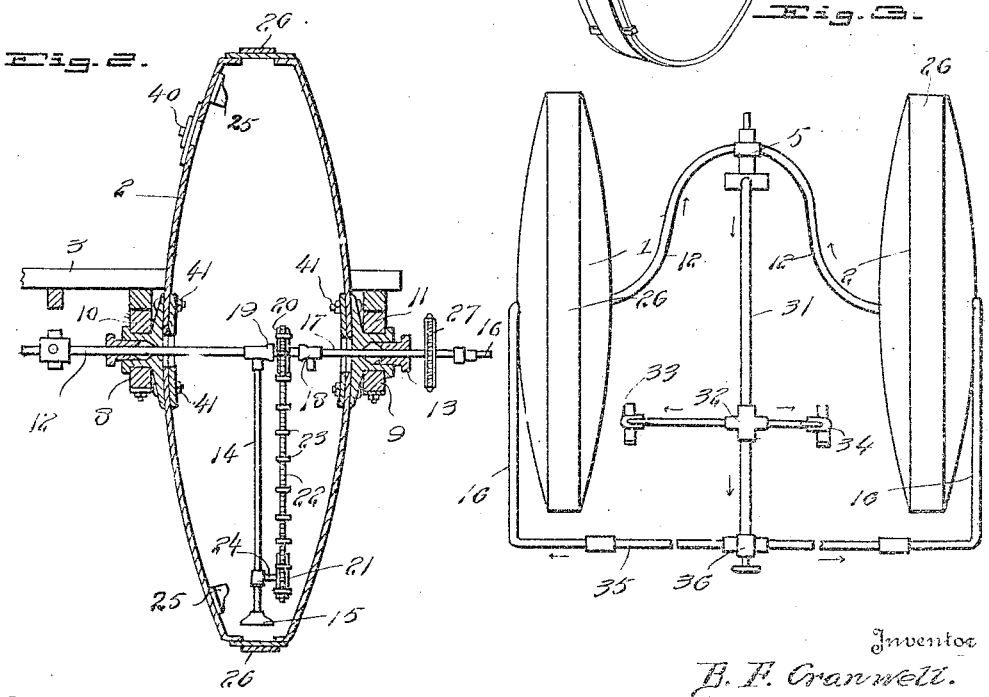
Witnesses
Inventor
B. F. Cranwell.
By ___ Attorney

UNITED STATES PATENT OFFICE.

BENJAMIN FRANKLIN CRANWELL, OF HENDERSON, NEW ZEALAND.

SPRAYING APPARATUS.

1,095,710.  Specification of Letters Patent.  Patented May 5, 1914.

Application filed March 11, 1912. Serial No. 682,911.

*To all whom it may concern:*

Be it known that I, BENJAMIN FRANKLIN CRANWELL, a citizen of the Dominion of New Zealand, and residing at Henderson, in the Provincial District of Auckland, in the Dominion of New Zealand, have invented certain new and useful Improvements in Spraying Apparatus, of which the following is a specification.

The invention relates to spraying apparatus in which the spray liquid is contained in a portable tank and the spraying is effected by a motor driven spray pump.

The invention has for an object to provide an efficient device of this character mounted upon hollow wheels designed to act as a reservoir for the spraying liquid, suitable means being carried upon the framework of the device for withdrawing, as desired, the liquid from the reservoirs and diffusing it upon the ground or objects to be treated.

Other and further objects and advantages of the invention will be hereinafter set forth and the novel features thereof defined by the appended claims.

The invention is illustrated in the drawing wherein:—

Figure 1, is an end perspective elevation, Fig. 2, a vertical sectional elevation of one of the drum wheels. Fig. 3 is a diagrammatic view showing the pump mechanism.

The drawing illustrates the employment of two drum wheels, but more may be used if desired.

Referring first to Fig. 1:—The wheels 1 and 2 are in the form of hollow drums adapted to contain a spraying fluid, and supporting a frame 3, upon which is mounted an oil motor 4 adapted to drive a spray pump 5 through the spur gearing 6. A pair of shafts 7 is connected to the frame for transport purposes.

The construction of the drum wheels is illustrated in Fig. 2, and as both drum wheels are precisely similar, it is only necessary to describe one of them. The drum wheel 2 has the journals 8 and 9, one upon each side, which are respectively carried in the bearings 10 and 11 fixed to the frame 3.

The suction pipe 12 from the pump passes through the journal 8, which is provided with a stuffing box 13, and a right angle extension pipe 14 therefrom is provided with a rose strainer 15 at is end which is located near the bottom of the drum wheel.

The return delivery pipe 16 from the pump (to conduct the spraying fluid back to the drum when spraying has been temporarily discontinued) is connected to a hollow spindle 17 which passes through the journal 9, and is provided with a spigot 18 through which the fluid is emitted.

A relief valve 16ª permits the spraying fluid to be returned to the drum wheel when the pressure of liquid from the pump, exceeds a predetermined limit. The end of spindle 17 is journaled in a cup bearing 19 upon the end of the pipe 12, and has fixed upon it a sprocket wheel 20 connected with a sprocket pinion 21 by a sprocket chain 22 having a series of agitating paddles 23. The sprocket pinion 21 is journaled upon an arm 24 projecting from the extension pipe 14.

A series of buckets 25 is secured to the inner wall of the drum wheel, and they are designed to raise a certain quantity of the spraying fluid during the revolution of the drum wheel for the purpose of further mixing and agitating the fluid.

A canvas ring or tread piece 26 around the circumference of the wheel drum is designed to minimize wear in traveling over rough surfaces.

The hollow spindle 17 is revolved by a sprocket wheel 27 fixed upon it and connected by a sprocket chain 28 with a driving sprocket pinion 29 upon a shaft 30, which is rotated by chain and sprocket gearing from the motor.

The spraying fluid is supplied to the drum through a screw filling plug 40. This plug is sufficiently large to give access to, the bolts 41 which secure the journals to the drum wheel, and, to the rose strainer and other parts within it.

Referring again to Fig. 1, the suction pipes 12 leading from the respective drum wheels are connected to the pump 5 and the delivery pipe 31 is provided intermediate its ends with a fitting 32. Leading from the lateral branches of this fitting are pipes respectively controlled by taps 33 and 34 and adapted to receive the rubber or other pipes leading to the spraying nozzles. The end of the pipe 31 is connected to the cross pipe 35, the respective ends of which are connected to the return delivery pipe 16 of the respective drums. The tap 36 upon the end of pipe 31 regulates the passage of liquid to the pipe 35 and the taps 37 and 38 may, one or other of them, be closed, to cause the overflow liquid to pass into whichever of the drums is desired.

The apparatus is particularly suitable for spraying crops, such as potatoes, which are planted in rows, and is specially adapted for short turnings in difficult situations.

What I do claim and desire to secure by Letters Patent of the United States is:—

1. A spraying apparatus, comprising a hollow drum, a pump, a suction pipe from said pump extending into said drum for drawing the spraying fluid therefrom, a return pipe also extending into said drum for returning fluid thereto, said return pipe including a rotatable section, means for rotating said section, and an agitating device operated by said section.

2. A spraying apparatus, comprising a hollow drum, a pump, a suction pipe from said pump extending into said drum for drawing the spraying fluid therefrom, a return pipe also extending into said drum for returning fluid thereto, said return pipe including a rotatable section, means for rotating said section, a wheel mounted on said section and rotated thereby, a second wheel supported by said suction pipe, and an agitating device operated by said wheels.

In testimony whereof I have signed my name to this specification in the presence of two witnesses.

BENJAMIN FRANKLIN CRANWELL.

Witnesses:
ARTHUR LEWITT FERNEYHOUGH,
FLORA ELIZABETH MILNE WILSON.